(12) United States Patent
Johnson

(10) Patent No.: US 7,346,817 B2
(45) Date of Patent: Mar. 18, 2008

(54) METHOD AND APPARATUS FOR GENERATING AND DETECTING INITIALIZATION PATTERNS FOR HIGH SPEED DRAM SYSTEMS

(75) Inventor: James Brian Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 268 days.

(21) Appl. No.: 10/924,306

(22) Filed: Aug. 23, 2004

(65) Prior Publication Data

US 2006/0041800 A1 Feb. 23, 2006

(51) Int. Cl.
*G11C 29/10* (2006.01)
*G11C 29/42* (2006.01)

(52) U.S. Cl. .................... 714/720; 714/728
(58) Field of Classification Search .............. 714/720, 714/712, 56, 43, 36, 25, 728; 708/253; 710/20, 710/45
See application file for complete search history.

(56) References Cited

U.S. PATENT DOCUMENTS

| | | | | |
|---|---|---|---|---|
| 4,227,178 A | * | 10/1980 | Gergaud et al. | 340/825.52 |
| 5,434,807 A | * | 7/1995 | Yoshida | 708/253 |
| 6,292,911 B1 | * | 9/2001 | Swanson | 714/715 |
| 6,430,696 B1 | | 8/2002 | Keeth | |
| 6,658,523 B2 | | 12/2003 | Janzen et al. | |
| 6,662,304 B2 | | 12/2003 | Keeth et al. | |
| 6,697,297 B2 | | 2/2004 | Keeth et al. | |
| 6,697,926 B2 | | 2/2004 | Johnson et al. | |
| 6,920,628 B2 | * | 7/2005 | Chen et al. | 716/19 |

OTHER PUBLICATIONS

IMAGE, Cellular Radio Library, Feb. 1991-Sep. 1996, pp. 1-353.*

* cited by examiner

*Primary Examiner*—Cynthia Britt
*Assistant Examiner*—Dipakkumar Gandhi
(74) *Attorney, Agent, or Firm*—Jones Day; Edward L. Pencoske

(57) ABSTRACT

A method and apparatus for determining the characteristics of a communications channel within a high speed memory system includes generating a first signal having a known and repeating pattern and generating a second signal having a pseudo-random pattern. The first and second signals are combined to produce a combined signal. The combined signal is transmitted over a communications channel of a memory system and is received by the memory devices of the memory system. Each memory device removes the second signal from the received combined signal to produce a received first signal. Parameters associated with transmitting and receiving may be adjusted by examining the pattern of the received first signal to determine if it has the known pattern of the first signal. Because of the rules governing abstracts, this abstract should not be used to construe the claims.

28 Claims, 2 Drawing Sheets

METHOD AND APPARATUS FOR GENERATING AND DETECTING INITIALIZATION PATTERNS FOR HIGH SPEED DRAM SYSTEMS

BACKGROUND

The present disclosure relates to high speed memories used in systems in which a communications channel exists between the memory and a control device and, more particularly, to methods and apparatus for characterizing the communications channel.

In a typical computer system, a processor interfaces with a memory device over a bus, typically through a memory controller. When a controller submits a read request to a memory device, the response from the memory device can be read by the controller from the bus after a delay of time, referred to as a "read latency." If a controller submits a write request, a memory device in the memory system can then receive the data from the bus and start to capture the data for storage after a certain "write latency."

The amount of latency can vary depending on the type of device and the communications channel. The amount of latency can also vary depending upon the type of request. For example, a memory subsystem may require 10-15 nanoseconds to respond to a read request, but only 5-10 nanoseconds to respond to a write request.

A memory controller, in advance of issuing a memory request, typically stores a specified latency value for each type of request and for each type of device. Therefore, when issuing a request, the controller can determine the period of time that it must wait before providing data to or receiving data from the bus. That period of time may be dependent, in part, on the characteristics of the communications channel.

There have been several proposals for initialization patterns for characterizing high-speed DRAM communications channels. One such proposal was given for SLDRAM in which a pseudo-random pattern was transmitted over the communications channel in the DRAM subsystem. A pseudo-random pattern was chosen because it has a detectable repetitive pattern while, at the same time, it provides a high degree of random signal transitions to adequately exercise the communications channel in a DRAM subsystem. Internal circuits of the DRAM and the controller are adjusted based on the successful detection of the pseudo-random pattern to compensate for channel and process imperfections in the memory subsystem.

One disadvantage with transmitting a pseudo-random pattern is the relative complexity of detecting the pseudo-random pattern compared to a more simplified pattern, such as a repeating pattern of 101010. Thus, a need exists for a method and apparatus of adequately exercising a communications channel with signals having a high degree of random signal transitions while at the same time simplifying the task of analyzing the received signal.

BRIEF SUMMARY

The present disclosure is directed to a method of determining the characteristics of a communications channel within a high speed memory system. The method may be comprised of generating a first signal having a known, repeating pattern and generating a second signal having a pseudo-random pattern. The first and second signals are combined to produce a combined signal. The "combining" may be a type of encoding or scrambling, such as inputting the first and second signals into an exclusive OR gate. The combined signal is transmitted over a communications channel of a memory system. The combined signal is received by the memory devices of the memory system. Each memory device removes the second signal from the received, combined signal to produce a received first signal. The "removing" may be a type of decoding or descrambling, such as inputting a third signal having the same pseudo-random pattern as the second signal (i.e., a copy of the second signal) and the received, combined signal into an exclusive OR gate. Parameters associated with transmitting and receiving may be adjusted by examining the pattern of the received first signal to determine if it has the known pattern of the first signal. More specifically, timing and or voltage verniers may be adjusted to successfully detect the combined signal transmitted over the communication channel. The examination may also be used to initialize the transmitting and receiving for maximum communications channel fidelity.

The present disclosure is also directed to an apparatus for determining the characteristics of a communications channel within a high speed memory system. The apparatus be comprised of a generator for generating a first signal having a known, repeating pattern and generating a second signal having a pseudo-random pattern. A scrambler circuit combines the first and second signals to produce a combined signal. The scrambler circuit may provide a type of encoding such as is obtained by inputting the first and second signals into an exclusive OR gate. A transmitter transmits the combined signal over a communications channel of a memory system. The combined signal is received by a receiver, each memory device within the memory system having such a receiver. Each memory device has a descrambler circuit for removing the second signal from the received combined signal to produce a received first signal. The descrambler circuit may provide a type of decoding such as is obtained by inputting a third signal having the same pseudo-random pattern as the second signal (i.e., a copy of the second signal) and the received combined signal into an exclusive OR gate. Parameters associated with transmitting and receiving may be adjusted in response to a circuit that examines the pattern of the received first signal to determine if it has the known pattern of the first signal. More specifically, timing and or voltage verniers may be adjusted to successfully detect the combined signal transmitted over the communication channel. The examination may also be used to initialize the transmitter and receiver for maximum communications channel fidelity.

BRIEF DESCRIPTION OF THE DRAWINGS

For the present invention to be easily understood and readily practiced, the present invention will now be described, for purposes of illustration and not limitation, in conjunction with the following figures, wherein.

DETAILED DESCRIPTION OF THE INVENTION

Figure 1:
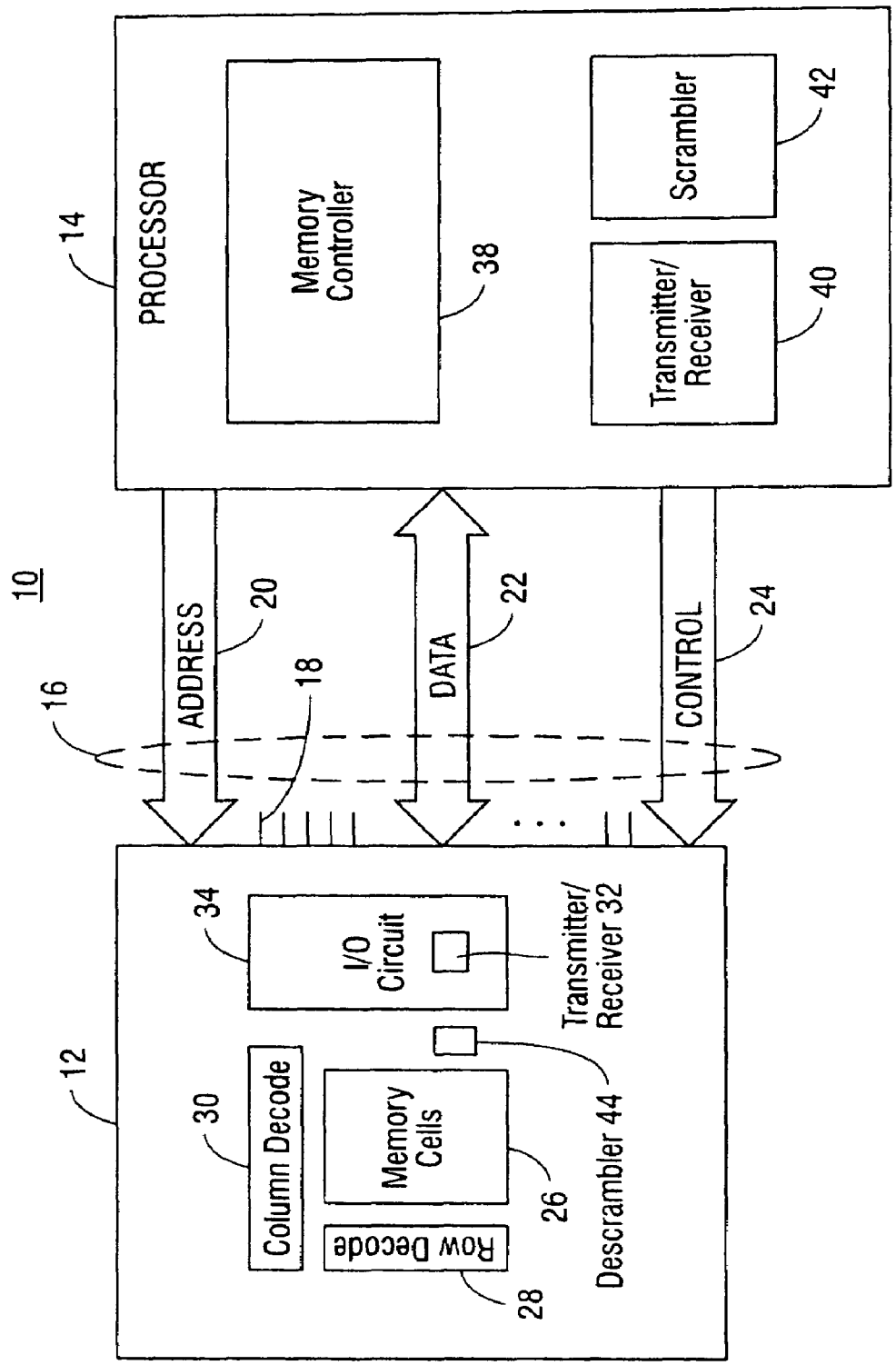
FIG. 1 is a high level block diagram illustrating a memory system employing one embodiment of the present invention.

FIG. 1 is a high level block diagram illustrating a memory system 10 employing one embodiment of the present invention. Those of ordinary skill in the art will recognize that the system 10 is shown greatly simplified such that emphasis can be placed on those components relevant to understanding the present disclosure while eliminating other components for clarity. The memory system 10 includes one or more memory chips or memory devices 12 in communication with a memory processor 14 via a system bus 16. The processor 14 can be a microprocessor, digital signal processor, embedded processor, micro-controller, dedicated memory test chip, or the like. In one embodiment, the processor 14 is a memory test chip that includes a memory controller 38, discussed below.

The memory device 12 has a plurality of pins 18 for electrically connecting the memory device 12 to other system devices. For example, some of pins 18 may connect the memory device 12 to the system bus 16, thereby allowing the processor 14 to communicate with the memory device 12 to perform memory read/write operations. In one embodiment, the memory device 12 is a dual in-line memory module (DIMM). The processor 14 and the memory device 12 communicate using address signals on address lines or address bus 20, data signals on data lines or data bus 22, and control signals (e.g., a row address select (RAS) signal, a column address select (CAS) signal, etc. (not shown)) on control lines or control bus 24. In FIG. 1, the address 20, data 22 and control 24 buses are shown to collectively form the system bus 16. Each line in the system bus 16 may be referred to hereinbelow as a "bit line." Thus, for example, eight bit lines in the data bus 22 are used to transfer a byte of data from the memory device 12 to the processor 14, and vice versa.

Although the discussion of data read/write operations given hereinbelow is primarily described with reference to the data bus 22, it is noted here that the test pattern generation discussed herein may be implemented on any portion of the system bus 16 (or any other signal-carrying lines connected to the memory device 12). In other words, the methodology of the present disclosure is not confined to only data-carrying bus applications, i.e., the data bus 22 portion of the system bus 16.

The memory device 12 can be a dynamic random access memory (DRAM) or another type of memory circuit such as SRAM (Static Random Access Memory) or flash memory. Furthermore, the DRAM could be a synchronous DRAM commonly referred to as SDRAM, a Synchronous Graphics Random Access Memory referred to as SGRAM, SDRAM II, or DDR SDRAM (Double Data Rate SDRAM).

The memory device 12 may include a plurality of memory cells 26 generally arranged in rows and columns to form an array for storing data. A row decode circuit 28 and a column decode circuit 30 may select the rows and columns in the array of memory cells 26 in response to decoding an address provided on the address bus 20. Data to/from the array of memory cells 26 is transferred over the data bus 22. When data is transferred to the memory device 12, the data is received by a transmitter/receiver 32 within an I/O circuit 34. Numerous peripheral devices or circuits such as sense amps and data paths are typically provided as part of the memory device 12 for writing data to and reading data from the array of memory cells 26. However, these peripheral devices or circuits are not shown in FIG. 1 for the sake of clarity.

The memory controller 38 (which may be part of processor 14) may generate relevant control signals (not shown) which are transmitted via a transmitter/receiver 40 on the control bus 24 to control data communication to and from the memory device 12. Some examples of the control signals (not shown in FIG. 1) on the control bus 24 include an external clock signal, a Chip Select signal, a Row Access Strobe signal, a Column Access Strobe signal, a Write Enable signal, etc.

Figure 2:
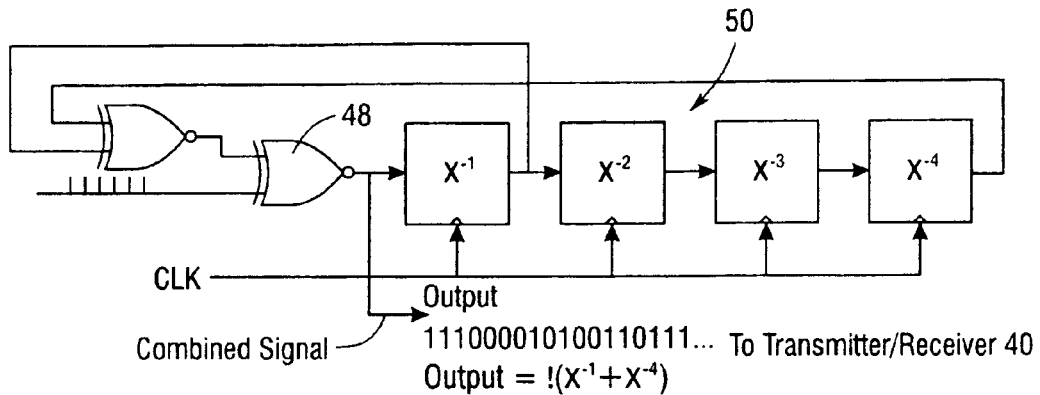
FIG. 2 illustrates one embodiment of a scrambler which may be employed in a processor or memory controller.
Figure 3:
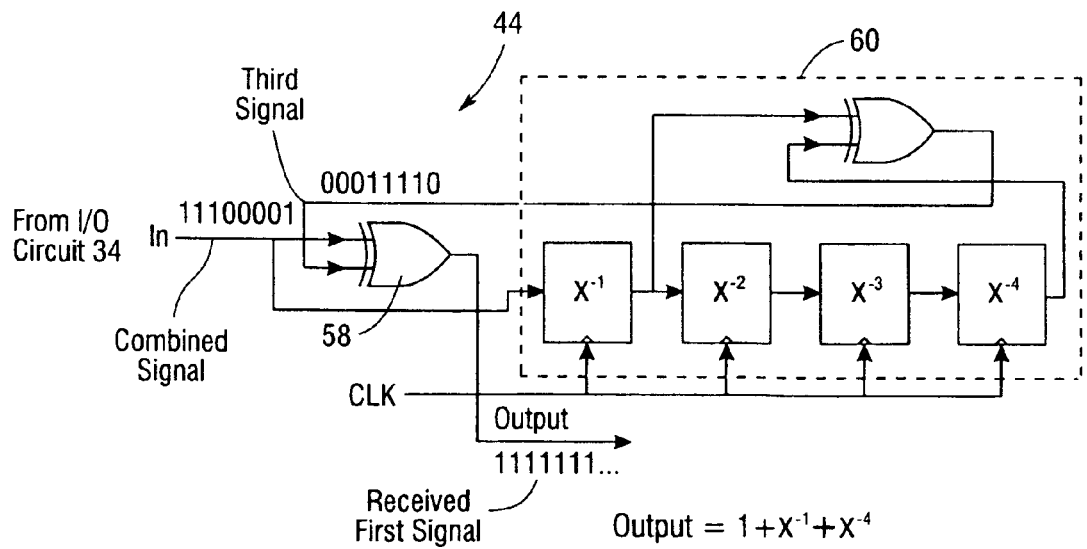
FIG. 3 illustrates one embodiment of a descrambler which may be employed in a high speed DRAM.

The processor 14 may include one or more circuits (not shown) for producing one or more patterns useful for various purposes. See, for example, U.S. Pat. No. 6,697,926 entitled Method and Apparatus for Determining Actual Write Latency and Accurately Aligning the Start of Data Capture With the Arrival of Data at a Memory Device, which is hereby incorporated by reference in its entirety. The present disclosure builds upon apparatus and methods for generating test patterns for various purposes such as testing the memory array, determining or adjusting read and/or write latencies, aligning receiving circuits for data capture and the like. That is accomplished by adding a first circuit 42 to the processor 14 and a second circuit 44 to the memory device 12. FIGS. 2 and 3 illustrate one embodiment of a first circuit 42 for scrambling and a second circuit 44 for descrambling. As will be described in greater detail in conjunction with FIGS. 2 and 3, the present disclosure is directed to combining a signal having a psuedo-random pattern with a signal having a preferably simple, known pattern by, for example, encoding to produce a combined signal. The combined signal, which is transmitted over the communications channel, e.g. bus 16, has a maximally disruptive signal transition pattern while providing an easily detectable data pattern at each of the memory devices 12. Timing or voltage verniers may then be adjusted to successfully detect the decoded pattern and the transmitter/receiver 40 and transmitter/receiver 32 may be initialized for maximum communications channel fidelity.

Turning to FIG. 2, FIG. 2 illustrates one embodiment for the scrambler circuit 42. In FIG. 2 an exclusive OR gate 48 is provided at one input terminal with a first signal having a known pattern. In the example shown in the figure, the known pattern, a series of 1's although other known patterns, preferably simple, may be used such as 10101010 . . . , are produced by a generator (not shown). Available at another input terminal of the exclusive OR gate 48 is a second signal having a psuedo-random pattern. The purpose of the exclusive OR gate 48 is to encode the first signal with the second signal. Other types of encoding or combining of the first and second signals to produce a combined signal may be provided. It is seen that the combined signal provides a maximally disruptive signal transition pattern to challenge the communications channel, i.e. bus 16. The combined signal may be input to the transmitter/receiver 40 for transmission.

Completing the description of the scrambler circuit 42 illustrated in FIG. 2, the remainder of the components of the circuit 42 may be viewed as a generator 50 for generating the second signal having the psuedo-random pattern. Any suitable circuitry may be provided so as to enable the function of generator 50.

Turning now to FIG. 3, an example of a descrambler circuit 44 is illustrated. Assuming no errors in transmission or reception, the output of the I/O circuit 34 should be an exact replica of the combined signal. The received combined signal is input at a first input terminal of an exclusive OR gate 58. Input at a second input terminal of the exclusive OR gate 58 is a third signal having the same psuedo-random pattern as the second signal, i.e. the third signal is a copy of the second signal. The operation of the exclusive OR gate 58 will be to decode the received combined signal to produce a received first signal. Because the received first signal is a simple known pattern, in this example all 1's, it is easy to determine whether there are any problems associated with the communications channel. An examination of the received first signal by circuitry or logic (not shown) enables timing and/or voltage verniers to be adjusted as well as the adjustment of parameters associated with the transmitter/receiver 40 and the transmitter/receiver 32 for maximum communications channel fidelity. Although in the example given here the first signal is a simple known pattern, as mentioned, other, somewhat more complicated signal patterns may be used to test for channel sensitivities at the expense of pattern recognition on the receiving end.

The use of a psuedo-random pattern for DRAM communications channel initialization according to the present invention provides several advantages. Psuedo-random patterns contain numerous transitions which should uncover communications channel weaknesses. Psuedo-random patterns are easily generated and provide cyclic rotational properties in a DDR system. Combining or encoding a known simple pattern with a psuedo-random pattern provides for an easily recognized pattern at the receiving end of the channel. Because of data pipeline depth, an $x^{-1}+x^{-4}$ pattern gives a maximal length pattern for a 4 or 8 bit burst granularity. The present invention can be used to generate a larger number of specific data signatures in the communications channel without increasing the length of the pattern or expanding the capacity of the hardware.

While the present disclosure has been described in connection with preferred embodiments thereof, those of ordinary skill in the art will recognize that many modifications and variations are possible. The present disclosure is intended to be limited only by the following claims and not by the foregoing description which is intended to set forth the presently preferred embodiments.

What is claimed is:

1. A method of characterizing a communications channel within a high speed memory system, comprising:
   generating a first signal having a simple, known, repeating pattern;
   generating a second signal having a pseudo-random pattern;
   combining said first and second signals to produce a combined signal having a large number of signal transitions;
   transmitting said combined signal from a processor to a memory device over a bus of a memory system;
   receiving said combined signal;
   removing said second signal from said received combined signal to produce a received first signal; and
   comparing a signal pattern of said received first signal to said simple, known, repeating pattern.

2. The method of claim 1 wherein said combining includes an exclusive OR operation.

3. The method of claim 2 wherein said removing includes an exclusive OR operation.

4. The method of claim 1 wherein said pseudo-random pattern includes an $x^{-1}+x^{-4}$ pattern.

5. The method of claim 1 additionally comprising adjusting said transmitting in response to said comparing.

6. The method of claim 1 additionally comprising adjusting said receiving in response to said comparing.

7. A method of characterizing a communications channel within a high speed memory system, comprising:
   generating a first signal having a simple, known, repeating pattern;
   generating a second signal having a pseudo-random pattern;
   encoding said first signal with said second signal to produce a coded signal having a large number of signal transitions;
   transmitting said coded signal from a processor to a memory device over a bus of a memory system;
   receiving said coded signal;
   generating a third signal having the same pseudo-random pattern as said second signal;
   decoding said received coded signal with said third signal to recover a received first signal; and
   examining the pattern of said received first signal.

8. The method of claim 7 wherein said encoding includes an exclusive OR operation.

9. The method of claim 8 wherein said decoding includes an exclusive OR operation.

10. The method of claim 7 wherein said pseudo-random pattern includes an $x^{-1}+x^{-4}$ pattern.

11. The method of claim 7 additionally comprising adjusting said transmitting in response to said examining.

12. The method of claim 7 additionally comprising adjusting said receiving in response to said examining.

13. A method of determining the transmission characteristics of a communications channel within a high speed memory system, comprising at a transmitting location:
   generating a first signal having a simple, known, repeating pattern;
   generating a second signal having a pseudo-random pattern;
   combining said first and second signals through an exclusive OR operation to produce a combined signal having a large number of signal transitions;
   transmitting said combined signal from a processor to a memory device over a bus of a memory system;
   and further comprising at a receiving location:
   receiving said combined signal;
   generating a third signal having the same pseudo-random pattern as said second signal;
   combining said received combined signal and said third signal through an exclusive OR operation to produce a received first signal; and
   comparing a signal pattern of said received first signal to said simple, known, repeating pattern.

14. The method of claim 13 wherein said pseudo-random pattern includes an $x^{-1}+x^{-4}$ pattern.

15. The method of claim 13 additionally comprising adjusting said transmitting in response to said comparing.

16. The method of claim 13 additionally comprising adjusting said receiving in response to said comparing.

17. An apparatus for characterizing a communications channel within a high speed memory system, comprising at a transmitting location:
   a generator for generating a first signal having a simple, known repeating pattern;
   a generator for generating a second signal having a pseudo-random pattern;
   a first circuit for combining said first and second signals to produce a combined signal having a large number of signal transitions;
   a transmitter for transmitting said combined signal from a processor to a memory device over a bus of a memory system, and comprising at a receiving location;
   a receiver for receiving said combined signal;
   a second circuit for removing said second signal from said received combined signal to produce a received first signal; and
   a circuit for examining the pattern of said received first signal.

18. The apparatus of claim 17 wherein said first circuit includes an exclusive OR gate.

19. The apparatus of claim 18 wherein said second circuit includes an exclusive OR gate.

20. The apparatus of claim 17 wherein said generator for generating a second signal produces a second signal having a pseudo-random pattern including an $x^{-1}+x^{-4}$ pattern.

21. The apparatus of claim 17 wherein transmission parameters of said transmitter are adjusted in response to said circuit for examining.

22. The apparatus of claim 17 wherein reception parameters of said receiver are adjusted in response to said circuit for examining.

23. A memory system of the type having a memory controller communicating with a plurality of memory devices through a communications channel, characterized in that said memory controller comprises:
   a generator for generating a first signal having a simple, known, repeating pattern;
   a generator for generating a second signal having a pseudo-random pattern;
   a first circuit for combining said first and second signals to produce a combined signal having a large number of signal transitions;
   a transmitter for transmitting said combined signal over a bus of a memory system, said memory system further characterized in that each of said memory devices comprises;
   a receiver for receiving said combined signal;
   a second circuit for removing said second signal from said received combined signal to produce a received first signal; and
   a circuit for examining the pattern of said received first signal.

24. The system of claim 23 wherein said first circuit includes an exclusive OR gate.

25. The system of claim 24 wherein said second circuit includes an exclusive OR gate.

26. The system of claim 23 wherein said generator for producing a second signal produces a second signal having a pseudo-random pattern including an $x^{-1}+x^{-4}$ pattern.

27. The system of claim 23 wherein said transmitter is responsive to said circuit for examining.

28. The system of claim 23 wherein said receiver is responsive to said circuit for examining.

* * * * *